United States Patent [19]
Gatiss et al.

[11] 3,920,401
[45] Nov. 18, 1975

[54] FLAME IONISATION DETECTORS

[75] Inventors: John William Gatiss; Peter Leonard Joynes; Romuald-Jerzy Liszka, all of Cambridge, England

[73] Assignee: Pye Ltd., Cambridge, England

[22] Filed: Aug. 23, 1973

[21] Appl. No.: 390,693

[30] Foreign Application Priority Data
Aug. 25, 1972 United Kingdom............ 39733/72

[52] U.S. Cl............................................. 23/254 EF
[51] Int. Cl.²................... G01N 27/62; G01N 31/12
[58] Field of Search......... 23/254 EF, 254 E, 232 C

[56] References Cited

UNITED STATES PATENTS
3,473,895  10/1969  Brittan et al.................. 23/254 EF Primary Examiner—Robert M. Reese
Attorney, Agent, or Firm—Frank R. Trifari; Ronald L. Drumheller

[57] ABSTRACT

A flame ionisation detector for the detection of organic gases or vapours. The detector includes a tubular body having one open end, the other end being closed except for passages for supplying gases to a burner which is adjacent to the closed end of the body. A tubular electrode is secured in the bore of an annular electrically insulating member which is removably mounted in the open end of the tubular body. The tubular electrode is electrically insulated from the tubular body; the tubular electrode and the burner are substantially coaxial with the tubular body. Means are provided introducing air under pressure into the space enclosed between the body and the tubular electrode so that incoming air moves towards the burner through the said enclosed space and combustion gases move away from the burner through the tubular electrode.

3 Claims, 8 Drawing Figures

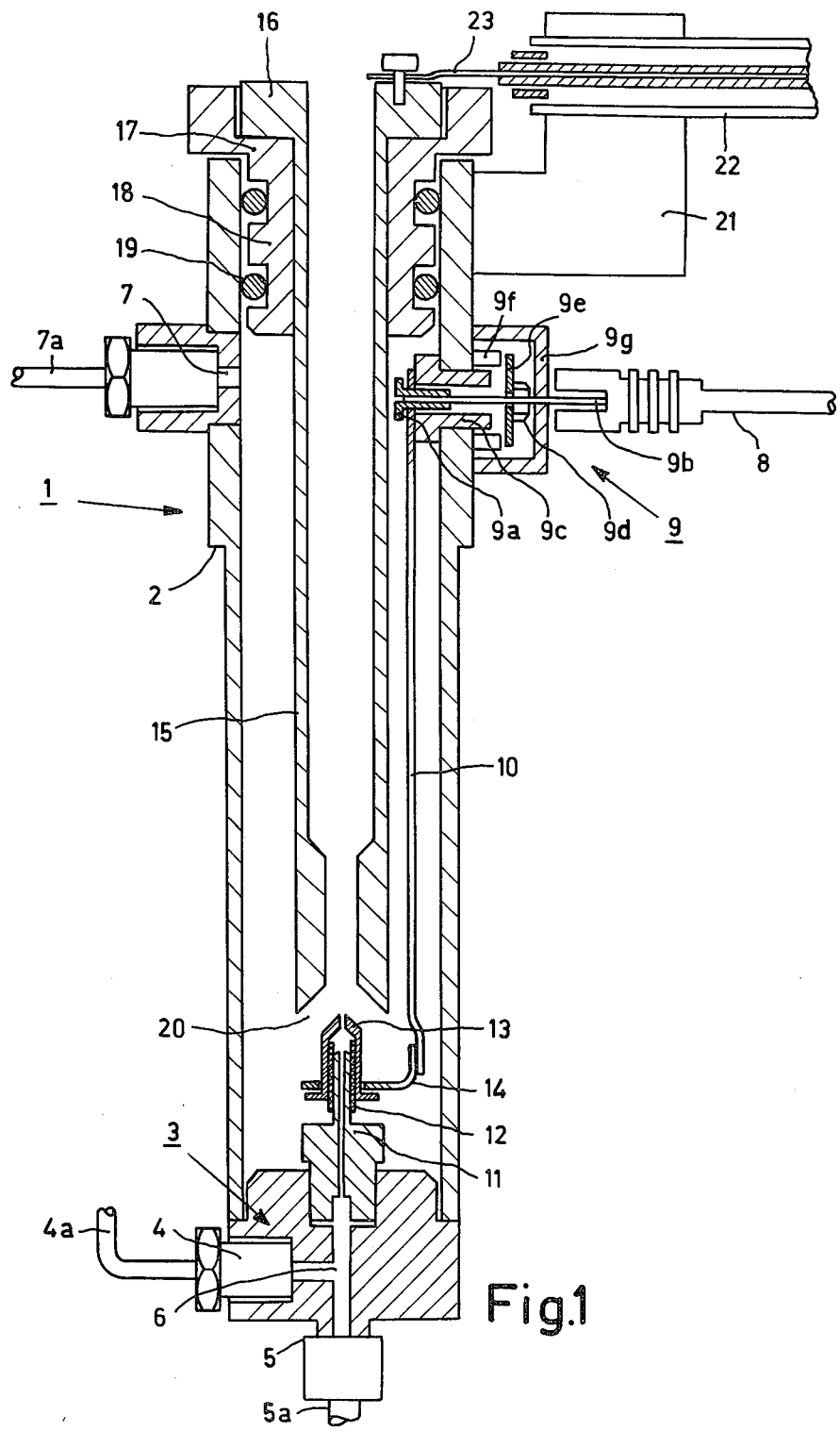

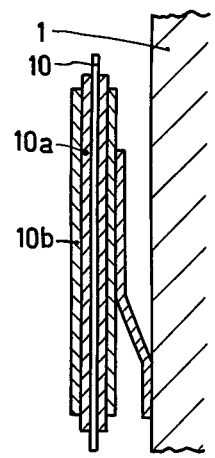
Fig.2a
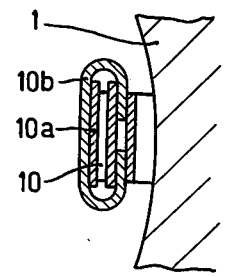
Fig.2b
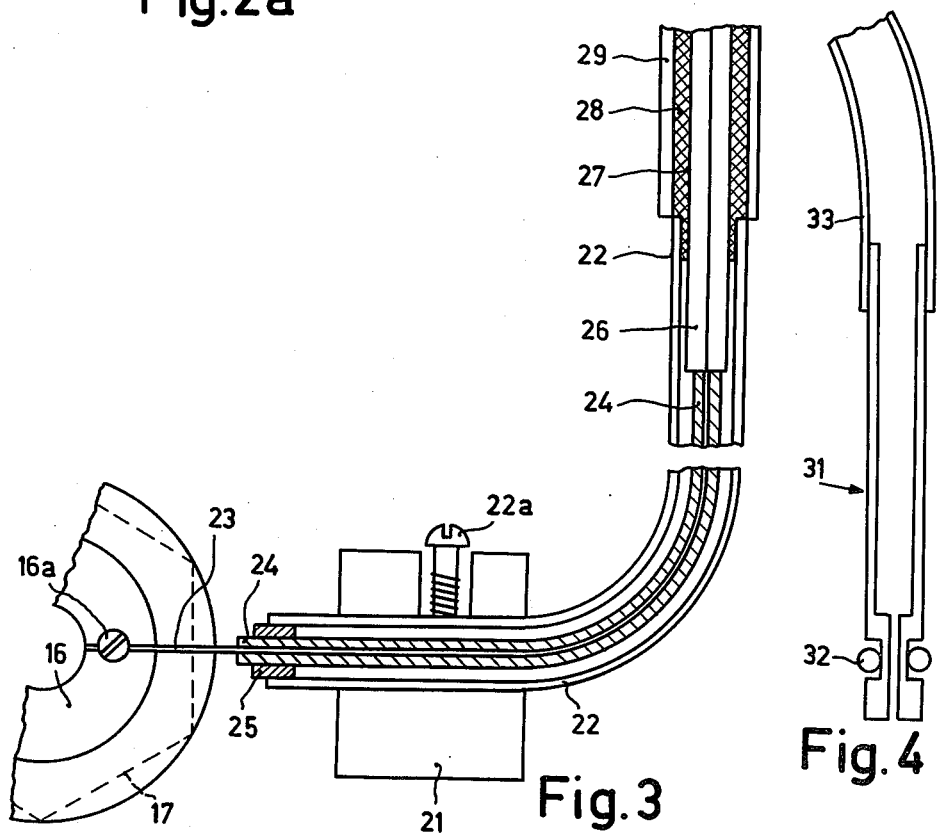
Fig.3
Fig.4

FLAME IONISATION DETECTORS

This invention relates to a flame ionisation detector for the detection and/or measurement of organic vapours or gases. Such detectors are typically used in gas chromatography. This invention is an improvement in or modification of the invention described in United Kingdom Pat. No. 1,127,173.

Claim 1 of United Kingdom Pat. No. 1,127,173 claims a flame ionisation detector for the detection of organic gases or vapours, comprising a tubular body, a burner adapted to serve as one electrode of the detector and mounted substantially coaxially within the body at or adjacent one end thereof, a tubular electrode mounted substantially coaxially within the body but electrically insulated therefrom and means for introducing air under pressure into the space enclosed between the body and the tubular electrode at or adjacent the end of the body remote from the burner so that incoming air moves towards the burner through the said enclosed space and away from the burner through the tubular electrode and is exhausted through an outlet communicating with the interior of the tubular electrode.

The present invention provides a flame ionisation detector for the detection of organic gases or vapours, comprising a tubular body having one open end, a burner mounted substantially coaxially within the tubular body adjacent the other end of the body, which other end is closed except for passages for supplying gases to the burner, a tubular electrode secured in the bore of an annular member of electrically insulating material, said annular member being removably mounted in the open end of the tubular body, the tubular electrode being substantially coaxial with the tubular body and being electrically insulated therefrom, means for introducing air under pressure into the space enclosed between the body and the tubular electrode at or adjacent the end of the body remote from the burner so that incoming air moves towards the burner through the said enclosed space and combustion gases move away from the burner through the tubular electrode.

According to one embodiment of the present invention, the tubular electrode is a force fit in the bore of the annular insulating member, and a flange at one end of the electrode may be located in a recess in the insulating member. The insulating member may be made of a filled polytetrafluoroethylene substance. A filled polytetrafluoroethylene substance comprises a mixture of a polytetrafluoroethylene and a filler, and is, for example a material sold under the trade Mark FLUROSINT by Polypenco Limited, Hertfordshire, England. The temperature coefficient of linear expansion of the insulating member material may be from half to three times the temperature coefficient of linear expansion of the tubular electrode material. The insulating member material may have a temperature coefficient of linear expansion at 150°C of 1 to 3 × 10$^{-5}$ per degree Centigrade. The electrode and/or the detector body may be made of stainless steel. The detector body may be made of an aluminium bronze.

According to another embodiment of the invention, the air and other gases which move away from the burner through the tubular electrode are exhausted from the body of the detector through an axial outlet which is formed by an end of the bore of the tubular electrode at the open end of the tubular body.

The tubular electrode may extend within the detector body as far as the burner, and part of the burner may project into the tubular electrode.

The burner may comprise a jet cap mounted on and electrically insulated from a gas feed pipe in the said other end of the body; the insulation may be effected by means of a sleeve or fibre glass. The said jet cap may be constructed of stainless steel and its orifice may be less than 20 thousandths of an inch in diameter.

According to another embodiment of the present invention, an electrical connection for the tubular electrode is attached or attachable thereto at or near an end thereof which is positioned at or near the open end of the body and is directly accessible from outside the body.

According to another embodiment of the present invention the last-mentioned electrical connection includes means accommodating a temperature difference which may exist during operation of the detector between the tubular electrode and the surroundings of the detector said means comprising a stainless steel armouring and earthing sheath which encloses polytetrafluoroethylene insulating material which surrounds a lead which is the electrical connection to the tubular electrode, the sheath being generally separated from the insulating material by an air-gap.

According to another embodiment of the invention an electrical connection to the burner passes through an insulating bushing located in the body wall at a position remote from the closed end of the body and extends from the bushing to the burner between the tubular electrode and the body wall. The portion of this connection situated in the said enclosed space may be surrounded by insulation, the outside of which may be earthed by connection to the body wall.

The flame ionisation detector may be mounted in or through the wall of a hot air oven such that the said other end of the body is within the said oven.

According to another embodiment of the invention, means are provided which can be positioned within the bore of the tubular electrode from outside the body of the detector through the axial opening in the tubular detector at or near the open end of the body, said means enabling the rate of flow of gas through the detector to be measured. The said means may comprise a generally tubular device whose outside surface effectively fits the bore of the tubular electrode so that the gas flowing therethrough passes through the interior of the device and is passed through a connected tube to an instrument for measuring gas flow.

A removable cap having the effect of an electrical screen and allowing free gas flow from the tubular electrode may be provided to fit over the open end of the tubular body.

An embodiment of the invention will be described by way of example with reference to the accompanying drawings in which:

FIG. 1 is a partly sectional representation of a flame ionisation detector according to the invention.

FIGS. 2a and 2b show in elevation and plan respectively a modification of part of the flame ionisation detector of FIG. 1;

FIG. 3 shows an arrangement of an electrical connection to the flame ionisation detector of FIG. 1;

FIG. 4 shows an interconnecting tube designed to be used with the flame ionisation detector to convey gas from the tubular electrode to a gas-glow meter.

Figure 5A:
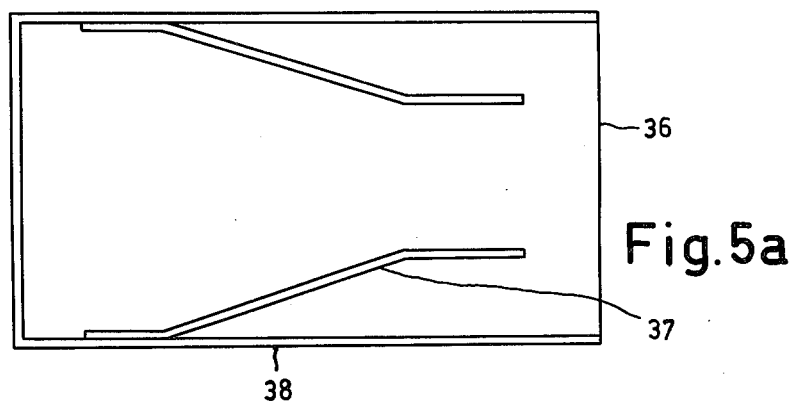
FIG. 5a, 5b and 5c are a plan view, a side elevation and an end elevation respectively of a removable cap for the flame ionisation detector of FIG. 1.

The flame ionisation detector has a stainless steel body 1 with an external surface which is similar to the body 1 of the flame ionisation detector described in United Kingdom patent specification No. 1,125,173 with reference to the drawings accompanying that specification and is cylindrically-shaped at the lower portion, and has a larger hexagonal crosssection at the upper portion, the two portions being separated by a shoulder 2. This shape enables the flame ionisation detector to be readily attached to the wall of a column oven in a chromatograph system in the manner described in United Kingdom patent specification No. 1,127,173 with reference to FIG. 3 of the drawings accompanying that specification. The detector can be mounted in the wall or body of a separate detector oven.

The internal surface of the body 1 is cylindrical and has a constant diameter. The top end of the body 1 is open and the bottom end is closed by a base 3 which in the present embodiment is a separate block that has been brazed to the tubular wall of the body 1. The base 3 contains an inlet 4 for a hydrogen supply pipe 4a which passes down the outside of the body 1 from the top portion of the body, and therefore also can be reached from the outside of a detector or of a column oven. The base 3 also contains an inlet 5 for a supply pipe 5a for the carrier gas plus sample from the outlet of a chromatograph separation column. The hydrogen, carrier gas and sample are mixed together in a passage 6 within the base 3. Near the open end of the body 1 there is a wide area 7 which serves as an air inlet into which is screwed a coupling for a pipe 7a supplying air.

A high tension electrical lead 8 enters the body 1 through a gas-tight insulating lead-in bushing arrangement 9 in the side wall in the upper portion of the body 1. The lead 8 is electrically connected to a rigid stainless steel plate 10 which is 7mm wide, passes down the interior of the body 1 and is spaced from the wall of the body 1.

The bushing arrangement 9 comprises a metal terminal collar 9a having a shank which passes through a hole in the metal plate 10 and is screwed onto the end 9b of the lead connection. A lip at the left hand side (as shown) of the collar 9a is provided, so that if the collar 9a moves to the right it tends to press the plate 10 against an insulating bush 9c positioned in the hole through the body wall. A nut 9d outside the wall of the body 1 screws along the lead-end 9b and urges a metal disc 9e against an insulating ring 9f placed against the wall of the body 1. Thus as the nut 9d is tightened against the disc 9e, the assembled components lead-end 9b, collar 9a, plate 10 and bush 9c are tightened against the body wall and a good electrical connection is made between the lead 8 and the plate 10. A cap 9g covers the exposed parts of the bushing arrangement 9.

A stainless steel boss 11 is screwed into the base 3 and is covered by a fibre-glass insulating layer 12 and is capped by a stainless steel jet cap 13 formed as a burner electrode which is secured upon the boss 11 and layer 12 by crimping. The jet of the burner communicates with the passage 6 in the base 3. The burner arrangement may be similar to the arrangement described in United Kingdom patent specification No. 1,127,173 but preferably is similar to the arrangement of our co-pending United Kingdom Patent specification No. 1,314,338.

A metal plate 14 is spot-welded to the bottom of the stainless steel plate 10. The plate 14 extends vertically downwards for about 10 mm and is then bent to the horizontal and at its free end is formed as a ring which fits over the burner electrode 13 as shown. This end of the plate 14 is pressed against and makes electrical contact with the burner electrode 13 by virtue of the geometry of the plate 10, the electrode 13 and the plate 14, and the disposition of the plate 10. The plate 14 is made of a material which is mechanically strong and chemically stable at the high temperature of the region of the burner electrode 13. In this embodiment the plate 14 is made of an alloy of Ni and Cr, in the ratio 80:20. It may be particularly desirable for the lead 8 to the burner electrode 13 to enter the upper portion of the body 1, so that when the flame ionisation detector is mounted on an oven, as mentioned above, the electrical connection to the burner electrode (as well as other electrical connections, described below, and the air and $H_2$ inlets, described above) is accessible from outside the oven. Also, this high voltage connection to the burner electrode is then situated in a relatively low temperature region.

A collector electrode 15 made of stainless steel is provided in the flame ionisation detector. This is generally tubular with an integral flange 16 at its upper end. The electrode 15 is a force fit in a supporting and insulating member 17 which is a removable fit in the open end of the body 1 and partially closes the bore of the tubular body 1. To accommodate the collector electrode 15, a bore coaxial with the body 1 and the jet of the burner 13 is formed through the insulating member 17, and in addition a coaxial recess of greater diameter than this bore is formed at the top end of the member 17 so as to accommodate the flange 16 integrally formed at one end of the electrode 15. The upper portion of the insulating member 17 forms a flange which fits over the top end of the hexagonal upper portion of the body 1; while the lower tubular portion 18 of the member 17 fits into the bore of the body 1. Sealing rings 19 of polytetrafluoroethylene-coated silicone rubber are situated in grooves in the lower portion of the insulating member 17 and effect an air-tight seal between it and the wall of the body 1, as well as preventing movement of the member 17 in the body. In the present embodiment the member 17 is a piece of FLUROSINT (Trade Mark) which is a filled polytetrafluoroethylene substance having a temperature coefficient of linear expansion ($2 \times 10^{-5}$ per degree Centigrade) similar to that of stainless steel.

When the electrode 15 has been fitted in the insulating member 17, the outside of the tubular portion 18 of the insulating member is carefully machined so as to ensure that the collector electrode 15 is accurately located with respect to the burner electrode 13 as mentioned below. As the tubular portion of the collector electrode 15 is a force fit in the bore through the insulating member 17, an effective gas-tight seal is formed. The top of the flange 16 is a little proud of the top of the insulating member 17.

The tubular portion of the collector electrode 15 passes through the bore of the insulating member 17 and extends co-axially in the body 1 almost as far as the burner electrode 13. The end of the electrode 14 adjacent to the burner 13 is tapered and the jet of the burner 15 is tapered, the electrode 15 and burner jet being disposed so that an annular duct 20 is formed between them. It is important that the tapered ends of the tubular electrode and the burner electrode should be accurately co-axial in the region of the duct 20, and the careful machining referred to above is carried out so as to achieve above-mentioned accurate location. An arrangement of the collector electrode 15 and burner electrode 13 designed to promote a laminar flow of air in the duct 20 and to improve the linearity of the response of the flame ionisation detector is the subject of our co-pending United Kingdom patent specification No. 1,314,338 and will not be further described.

If required, the plate 10 may be insulated and earthed to avoid electrical interference between it and the collector electrode 15. Such an arrangement is shown in FIG. 2, wherein strips of insulating material 10a are placed on either side of the plate. A suitable insulating material is FILAMIC (Trade Mark) which is a reconstituted mica solid in sheet form which is fabricated from mica flakes bonded together with an organic binder by Langley London Limited, Sussex, England. This is surrounded by a stainless steel sleeve 10b which is earthed by connection to the interior of the wall of the body.

A support 21 in which a stainless steel protective piping 22 is secured by means of a fixing screw 22a (FIG. 3), is brazed on the upper portion of the body 1. This piping 22 which is connected to earth, encloses an electrical lead 23 for the collector electrode 15, and as well as providing armouring it accomodates the temperature drop between the flame ionisation detector and the rest of the electrical circuit which is remote from the detector. The collector electrode lead 23 is surrounded by a polytetrafluoroethylene insulating sleeve 24 and is positioned within the protective piping 22 which is plugged with a silicone rubber bung 25. There is an air-gap between the polytetrafluorethylene insulating sleeve 24 and the piping 22. At the cool end of the piping 22 the lead 23 joins a co-axial cable which comprises a polyethylene inner insulation 26, a graphite layer 27 and a copper screening mesh 28 and a polyvinyl chloride sheath 29. The polytetrafluoroethylene sleeve 24 terminates where the polythene insulation 26 of the cable begins, while the steel piping 22 extends further and overlaps come of the polythene, graphite and copper. The piping 22 is axially slit at this region and is crimped onto the connecting cable. The collector electrode lead 23, which may be made of nickel and is brazed to the central conductor of the coaxial cable, passes directly to the top of the flange 16 of the collector electrode, to which it is attached by means of a screw 16a. By virtue of the novel mounting and insulating arrangement of the collector electrode and of the collector lead arrangement, this connection is much simpler than in prior art flame ionisation detectors.

The previously mentioned air inlet 7 is situated just under the insulating closure member 17. As explained in United Kingdom patent specification No. 1,127,173, air passes round the tubular electrode 15 cooling the insulating member 17 and the electrode 15 and tending to clear the walls of the tubular electrode 15. Air passes down between the electrode 15 and the body wall to the annular duct 20 where it takes part in the burning of the mixture of the hydrogen and the sample in the carrier gas. The combustion products then pass up the inside of the tubular electrode 15 and pass out of the flame ionisation detector directly through the top opening of the axial bore of the tubular electrode 15.

Flame ionisation detectors rely on a good electrical insulation between the collector electrode which must handle very small signal currents varying over a range of several orders of magnitude, and the earthed body. High noise levels can easily be caused by leakage currents in the insulation. One of the difficulties in this respect is caused by certain substances (for example chlorine) which may be present in the exhaust gases which can affect the insulation material and produce leakage current paths in the insulation. The present design is advantageous in this respect because, as can be seen from FIG. 1, exhaust gases passing through the tubular electrode 15 do not impinge directly on the insulation. Moreoever, in the present design, there is a relatively long electrical creepage path between the collector electrode 15 and the body 1.

The gas flow through the device can also itself be easily measured before the gas is ignited. A specially shaped interconnecting tube 31 shown in FIG. 4 can be inserted at the top of the tubular electrode 15. A rubber sealing ring 32 ensures that all the gas passing through the tubular electrode passes through the interconnecting tube and through a flexible tube 33 which leads for example to a bubble-flowmeter.

In many flame ionisation detectors of the type to which this invention relates, the normal and most convenient method of measuring the gas flow is to pass the gas issuing from the detector to a flowmeter such as a bubble flowmeter. It is therefore necessary for the flame ionisation detector to be substantially gas-tight. Thus prior art gas meters for example of the pattern described in United Kingdom specification 1,127,173, are generally constructed in such a manner that their upper end is sealed. In a combination of the flame ionisation detector according to the present invention and means enabling the gas flow through the detector to be measured, it is not necessary for the upper end of the detector to be sealed.

The procedure for preparing the flame ionisation detector for operation may be as follows. A carrier gas, hydrogen and air are passed into the detector through the inlets 4, 5 and 7 respectively; the tube 31 is positioned within the bore of the tubular electrode 15. The gas flow-rate through the tubular electrode 15 is measured, and the gas inlet rates are adjusted to desired values. The tube 31 is removed and a wand bearing ignition means, for example a glow filament, is inserted from the open end of the detector to the region of the burner. Thus the gas flow-rates can be conveniently measured before ignition and the gas mixture can be ignited without altering any of the flow-rates.

Figure 5B:
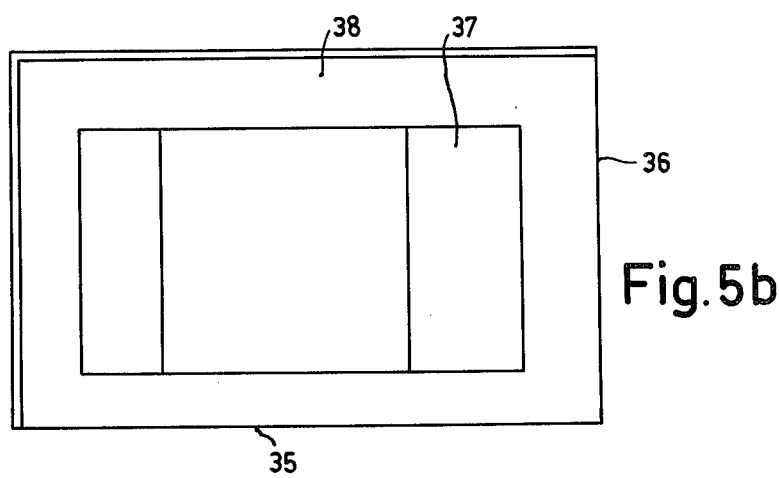
Figure 5C:
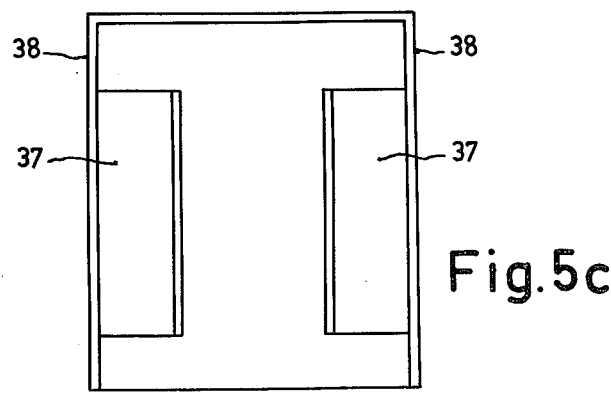

FIGS. 5a, 5b and 5c show a stainless steel removable protective dust cap which can fit over the top of the instrument and provide electrical screening. The cap is shaped as a rectangular box, and is open at its bottom 35 and at one end 36 which fits over the lead 22. Spring plates 37 attached to the interior of the side walls 38 grip on the sides of the brazed-on mount 21 and provide electrical connection. For best results, the cap should be in place whenever the flame ionisation detector is being used for analysis.

The mounting of the flame ionisation detector on a chromatographic column oven, and the electrical circuits that may be used, and the method of operation, are similar to the arrangements described in United Kingdom patent specification No. 1,127,173, particularly with reference to FIGS. 3, 4 and 5 of that specification. The device can be similarly used in a detector oven as mentioned above, and may be used in conjunction with other devices for detecting the column output.

The present invention improves the electrical connection to the burner electrode 13 by providing a connection up the wall of the body 1 to a bushing connection to the lead 8 which is positioned in the upper portion of the body. Thus when the flame ionisation detector is mounted in a chromatograph column oven, as described in United Kingdom patent specification No. 1,127,173, adjustments to all the electrical and gas connections can be made from outside the oven. Further, the high voltage lead-in is in a relatively low temperature region and tends to be cooled by incoming air.

What we claim is:

1. In a flame ionisation detector for the detection of organic vapours or gases, said detector having a tubular metal body, a burner having a jet cap electrically insulated therefrom and adapted to serve as one electrode of the detector, said burner mounted substantially coaxially within said body at or adjacent one end thereof, a tubular metal electrode, means for mounting said tubular metal electrode substantially coaxially within said body including means electrically insulating said tubular metal electrode therefrom, said mounting means being located at or adjacent the end of said body remote from said burner, and means for introducing air under pressure into the space enclosed between said body and said tubular electrode at or adjacent the end of the body remote from said burner so that the incoming air first cools and purges said mounting means for said tubular electrode, then moves towards said burner through said enclosed space and away from said burner through said tubular electrode, the improvement comprising a rigid electrically conductive lead in electrical contact with said jet cap and mounted between and spaced from said body and said tubular electrode, and an insulating bushing mounted in said body at or adjacent the end remote from said burner, said lead exiting said body through said bushing.

2. In a flame ionisation detector having the improvement defined in claim 1, the further improvement wherein said tubular electrode has an unobstructed straight bore which is open at the end remote from said burner, said tubular electrode projecting beyond said body.

3. In a flame ionisation detector having the improvements defined in claim 2, the further improvement comprising a thermally insulated electrical lead connected to the end of said tubular electrode remote from said burner without obstructing the bore of said tubular electrode.

* * * * *

UNITED STATES PATENT AND TRADEMARK OFFICE
CERTIFICATE OF CORRECTION

PATENT NO. : 3,920,401
DATED : November 18, 1975
INVENTOR(S) : JOHN WILLIAM GATISS ET AL It is certified that error appears in the above–identified patent and that said Letters Patent are hereby corrected as shown below:

Column 3, line 7, "1,125,173" should be --1, 127,173-- line 60, cancel "is"

line 61, cancel "and" (first occurrence)

Signed and Sealed this

Fourteenth Day of December 1976

[SEAL]

Attest:

RUTH C. MASON
*Attesting Officer*

C. MARSHALL DANN
*Commissioner of Patents and Trademarks*